United States Patent [19]
Berger et al.

[11] 4,435,005
[45] * Mar. 6, 1984

[54] JOINT FOR CONDUIT WITH SINGLE THREADED END

[75] Inventors: Sidney Berger, Great Neck; Salvatore Buda, East Hills; Burton Weintraub, Old Bethpage, all of N.Y.

[73] Assignee: Berger Industries, Inc., Maspeth, N.Y.

[*] Notice: The portion of the term of this patent subsequent to Oct. 5, 1993 has been disclaimed.

[21] Appl. No.: 153,893

[22] Filed: May 28, 1980

Related U.S. Application Data

[63] Continuation-in-part of Ser. No. 612,030, Sep. 10, 1975, abandoned, and Ser. No. 559,019, Mar. 17, 1975, Pat. No. 3,984,130.

[51] Int. Cl.³ .................................................. F16L 17/02
[52] U.S. Cl. .................................. 285/31; 285/175; 285/354; 285/388
[58] Field of Search ............. 285/388, 387, 31, 32, 285/321

[56] References Cited

U.S. PATENT DOCUMENTS

| | | | |
|---|---|---|---|
| 459,910 | 9/1891 | Hogan | 285/388 |
| 798,078 | 8/1905 | Simpson | 285/388 |
| 1,119,752 | 12/1914 | Goethner et al. | 285/388 |
| 1,771,949 | 7/1930 | Blanchard | 285/276 |
| 2,253,018 | 8/1941 | Cowles | 285/388 |
| 2,390,445 | 12/1945 | Mercier | 285/321 X |
| 2,480,174 | 8/1949 | Yost | 285/388 X |
| 2,901,269 | 8/1959 | Richard | 285/321 X |
| 3,544,281 | 12/1970 | Phillips | 285/DIG. 22 X |
| 3,984,130 | 10/1976 | Berger et al. | 285/388 X |

FOREIGN PATENT DOCUMENTS

| | | | |
|---|---|---|---|
| 883511 | 3/1943 | France | 285/393 |
| 755118 | 8/1956 | United Kingdom | 285/388 |

*Primary Examiner*—Thomas F. Callaghan
*Attorney, Agent, or Firm*—Kirschstein, Kirschstein, Ottinger & Israel

[57] ABSTRACT

A coupling sleeve for joining the ends of two conduits. One end is threaded, the other is unthreaded. The conduit has a female thread which engages the threaded end. The unthreaded end has a terminal portion of reduced external diameter running to an inwardly displaced groove in which a locking ring is disposed. The end of the coupling sleeve which engages the unthreaded conduit end has a recess in which the locking ring is axially slidable and a flange that engages a full diameter external section of the unthreaded end. The recess is long enough to permit the coupling sleeve to be fully received on the unthreaded conduit end when the female thread is disengaged from the threaded end of the conduit.

16 Claims, 30 Drawing Figures

JOINT FOR CONDUIT WITH SINGLE THREADED END

CROSS-REFERENCE TO RELATED APPLICATIONS

This application is a continuation-in-part application of our application Ser. No. 559,019 filed Mar. 17, 1975 for PIPE JOINT FOR AN INTERMEDIATE METAL CONDUIT (now U.S. Pat. No. 3,984,130), and of our co-pending application Ser. No. 612,030 filed Sept. 10, 1975 for JOINT FOR CONDUIT WITH SINGLE THREADED END (now abandoned), said application Ser. Nos. 559,019 and 612,030 being co-pending with each other.

BACKGROUND OF THE INVENTION

1. Field of the Invention

The invention relates to a joint for conduit of a wall thickness sufficient to permit threads to be formed therein, and, more particularly, to a joint wherein sections are assembled by using a coupling ring which will permit sections to swivel with respect to one another during coupling and to be disassembled without axial longitudinal displacement of adjacent conduit sections.

2. Prior Art

Until very recently, there were on the market only two kinds of steel conduit for electrical cables; one of these was called rigid pipe and the other was called light walled conduit.

The rigid pipe has been available for over one hundred years. It is a thick walled pipe that is conventially used for the transmission of gas and water. It also is used for sheathing electric wires in buildings in which case it is frequently embedded in concrete. As a sheathing for electrical cables, rigid pipe is used where the pipe has to be very strong, or where the pipe may be subjected to a heavy or sudden shock load. This type of pipe comes in various lengths, depending upon the trade but is essentially from ten feet to twenty feet long.

Rigid pipe sections are connected by screw couplings. Both ends of a pipe section have tapered male threads formed thereon. These threads are V-shaped to standarized dimensions having a slightly flattened crest and a slightly flattened base. Both ends of a screw coupling have tapered female pipe threads which mesh with the male pipe threads. The mesh is quite good and because the threads are tapered, when they are joined they make a joint that is essentially hermetic, that is, a joint that does not require sealing agents such as mastic or pipe compound, although sealing agents may be used.

The difficulties associated with the use of rigid pipe become apparent when such pipe is to act as a conduit for electric cables. Because the pipe is thick walled, each section is highly priced. In addition, each section is difficult to handle because of its weight. Because both ends of the pipe are threaded, each section must be rotated in the field when it is connected to another length of pipe. The weight of the pipe section makes the rotation difficult. Another drawback is that, if a section of pipe or a fitting is damaged, either the pipe or fitting has to be cut to eliminate the same and replaced, or the entire layout must be unscrewed piece by piece until the damaged section or fitting is removed.

Moreover, since the screw couplings must mesh with male threads on adjacent pipe sections, the sections must be in perfect axial alignment or the threads will not mesh properly. As is often the case in field installations, or where replacements must be made to existing pipe systems, the pipe sections are not in perfect alignment and problems result in assembling the sections.

The other kind of conduit which has been developed for sheathing electrical cables is light walled conduit. Light walled conduit was designed solely as a conduit for encasing electric cables to protect them from damage. Because it does not have to take large stresses, it is thin walled. Obviously, an advantage of light walled conduit is its lighter weight and its lower cost.

A disadvantage is that it cannot be used in instances where it might be subjected to heavy loads. In addition, because of its thin wall, this type of conduit can not be threaded. Compression couplings are used most often to join sections of light walled conduit. The ensuing joint cannot withstand substantial internal pressure or tensile stress. The advantage of compression couplings over the screw couplings used in conjunction with the rigid pipe is that if any section of tubing or any fitting is damaged, the coupling can be opened and the damaged pipe section or fitting can be pulled out transversely without removing the fittings or sections that were not damaged.

Recently, due to the scarcity of and resulting higher prices for steel, a medium walled pipe known as utility pipe or intermediate metal conduit was developed having a wall thickness less than the wall thickness of the rigid pipe but greater than the wall thickness of the light walled conduit. This intermediate metal conduit is heavy enough to take intensive loads and can be hermetically sealed at the joints.

Intermediate metal conduit has used screw couplings for joints, causing the same problems to arise in connection with this conduit as with the rigid pipe. Namely, the necessity of rotating conduit sections to make up joints or the necessity of unscrewing the sections one after another from an end of a run of pipe when an intermediate section or fitting is to be removed. Further, the axial alignment problem inherent in the rigid pipe system is also present.

It is toward elimination of the foregoing and other difficulties that the present invention is directed.

SUMMARY OF THE INVENTION

1. Purposes of the invention

It is an object of the present invention to provide a novel joint for conduit which can be threaded providing a substantially hermetic connection between two sections of conduit.

Another object of the present invention is to provide a novel joint for conduit which can be threaded in which the coupling is captively attached to the conduit section.

A further object of the present invention is to provide a novel joint for conduit which can be threaded wherein the coupling permits some swiveling movement between lengths as they are joined.

Yet another object of the present invention is to provide a novel joint for conduit which can be threaded which will permit shortening of lengths of conduit in the field for accommodation of existing spatial requirements.

A still further object of the present invention is to provide a novel joint for conduit which can be threaded which will permit removal of individual lengths without axially displacing adjacent conduit sections or disassembling the system from one end to a point where replacement of a section or fitting is to be accomplished.

Other objects of the invention in part will be obvious and in part will be apparent in the following description.

2. Brief Description of the Invention

Generally speaking, identical first and second conduit sections having constant diameter axial passageways are joined by means of a coupling sleeve. The sections are thick enough to be threaded and one end of each section is male threaded. The coupling sleeve is mounted captively on a non-threaded end of the first conduit section, being freely rotatable thereon and axially slidable to a limited extent. This end has a length of reduced outside diameter extending axially inwardly from the end face of the first conduit section to create a stop shoulder in the outer wall surface. An annular lock ring groove in the outer wall surface is spaced inwardly from the stop shoulder. A resilient constrictable lock ring means is located within the annular lock ring groove. In its normal unbiased condition the lock ring means partially projects from the annular lock ring groove above the outer wall surface. The coupling sleeve has a pair of inwardly extending flanges, one at each end with an internal annular clearance formed therebetween. The flanges form central openings in mutual axial alignment but having different diameters. The first flange defines an opening slightly greater in diameter than the unreduced outer wall surface. The second flange defines a central opening which is slightly greater in diameter than the diameter of the reduced outside diameter length. The axially inward surface of the first flange and the axially outward surface of the lock ring means are so mutually formed, e.g., by the provision of a camming surface on one or both of them, that when the coupling sleeve is forced axially inwardly along the non-threaded end of the conduit section, the camming surface causes the lock ring means to be constricted and thereby forced fully into the annular lock ring groove so that the first flange rides over the lock ring means. After the first flange passes over the lock ring means, the lock ring means returns to its normal unbiased condition and at this time protrudes partially into the annular clearance of the coupling sleeve.

To assemble the conduit sections, the flat substantially perpendicular end faces of the sections, one at the unthreaded end and the other at the threaded end, are butted together. The coupling sleeve is then screwed on to the threaded end until the first flange presses against the lock ring means, forcing the two flat end faces of the sections together under considerable stress to form a tight joint.

The axially outward surface of the first flange and the axially inward surface of the lock ring means are so mutually formed that the application of a force tending to pull the coupling sleeve off the associated conduit section will not exert a radially inward constrictive force on the lock ring means. Conveniently, this may be accomplished by making the axially outward surface of the first flange flat and perpendicular to the longitudinal axis of the conduit section and by making the axially inward surface of the lock ring means flat and perpendicular to the longitudinal axis of the conduit section. Alternatively, the surface of the flange may slope radially outwardly in a direction away from the second flange with the surface on the lock ring means forming a mating surface, i.e. sloping radially outwardly in a direction away from the stop shoulder.

Assembly is performed in the field without rotating either section.

Because of the slight clearance between the first flange and the conduit section, two adjacent conduit sections may be slightly out of axial alignment without interfering with engagement between the coupling sleeve and the threaded end of the section on which it is to be screwed.

To disassemble the sections, the coupling sleeve is unthreaded from the adjacent conduit section and retracted axially inwardly until the second flange abuts the stop shoulder, in which position the end face of the coupling sleeve will be flush with the end face of the conduit section to allow either conduit section to be laterally displaced without any longitudinal movement relative to the other conduit section.

The invention consists in the features of construction and arrangement of parts which will be detailed hereinafter and described in the appended claims.

BRIEF DESCRIPTION OF THE DRAWINGS

For a better understanding of the above invention, reference should be had to the accompanying drawings wherein like numerals of reference indicate similar parts throughout the several views and wherein.

DESCRIPTION OF THE PREFERRED EMBODIMENT

Figure 1:
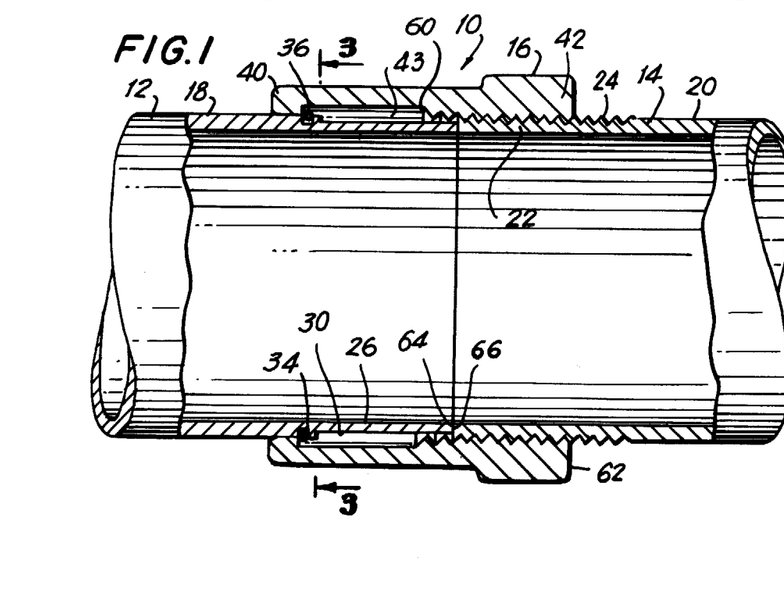
FIG. 1 is a sectional axial view of two assembled conduit sections embodying the present invention.
Figure 2:
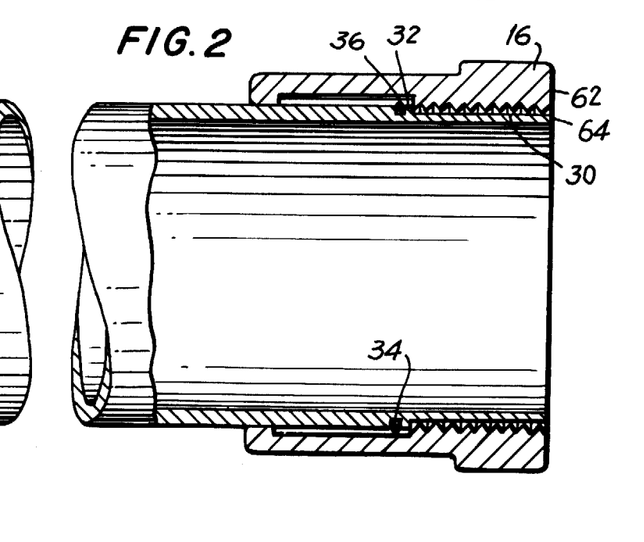
FIG. 2 is a sectional axial view of a conduit section with the coupling sleeve in its fully retracted position.
Figure 3:
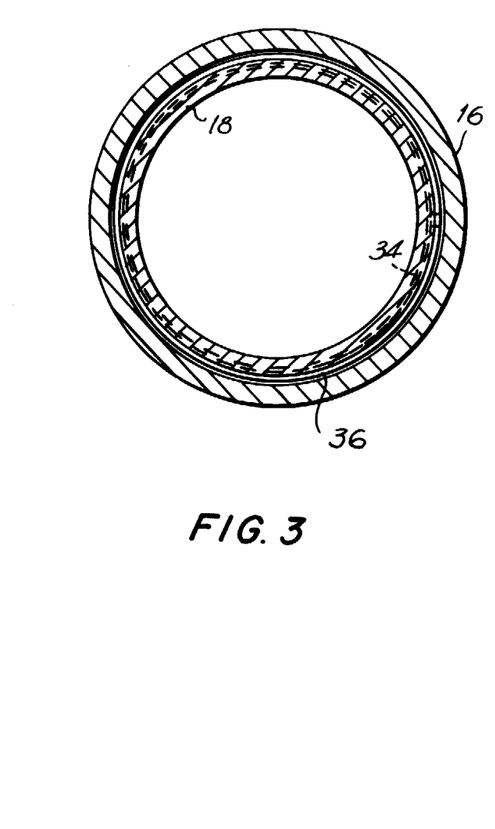
FIG. 3 is a sectional view taken substantially along the line 3—3 of FIG. 1.

With reference to FIGS. 1 and 2, a pipe joint for threadable conduit is identified generally by the reference numeral 10. It includes a first and a second conduit section 12 and 14, respectively, and a coupling sleeve 16 which is held captively on the end of section 12. The sections 12 and 14 are identical. The sections 12 and 14 have generally cylindrical outer wall surfaces 18 and 20, respectively, and each has a constant diameter axial passage therethrough. These sections typically are made of metal such as mild steel, wrought iron, a silicon bronze alloy or an aluminum alloy. As can be seen, the end portion 22 of the second section 14 has a tapered male pipe thread 24 formed in its outer wall surface 20. As used herein, the term "section" is defined to mean a conduit of a length which is equal to at least four times the outer or external diameter of the conduit. The lengths of the conduit sections are standard in the pipe field, namely, about 10 feet for intermediate metallic conduit and 20 feet for rigid pipe conduit. Each length of conduit is quite heavy, since it has an appreciable wall thickness to enable it to be threaded. Typical weights of conduit sections for steel pipe are:

| Diameter | Lbs. per Section Intermediate Metal Conduit | Lbs. per Section Rigid Conduit | Lbs. per Section Extra Heavy Rigid Conduit |
|---|---|---|---|
| 2" | 23.0 | 113.5 | 133.0 |
| 2¼" | 37.9 | 140.2 | 165.0 |
| 3" | 46.5 | 173.6 | 205.1 |
| 3¼" | 53.3 | 200.3 | 237.1 |
| 4" | 60.2 | 227.0 | 269.1 |
| 5" | 92.3 | 283.7 | 337.3 |
| 6" | 110.5 | 340.4 | 405.3 |
| 8" | 144.7 | 447.2 | 533.5 |

While only a portion of each section of conduit is illustrated, it is to be understood that each section has one end on which is captively mounted a coupling sleeve in accordance with the present invention, and another end having male pipe threads formed therein.

In the specification and the claims, the term "axially inwardly" and "axially outwardly" are used with reference to the end face of the conduit section on which the coupling sleeve is retained, that is "axially inwardly" refers to a vector extending from that end face of the conduit section towards the other end face of the conduit section. Conversely, "axially outwardly" refers to a vector extending outwardly away from that end face.

The coupling sleeve 16 is free for rotation and for limited axial movement relative to the end 26 of the first section 12. As can be seen in FIGS. 1 and 2, a short length 30 of reduced diameter ending at a stop shoulder 32 is selected to permit the coupling sleeve 16 to be retracted axially inwardly along the first section 12 at least far enough for the end face of the coupling sleeve 16 to be flush with the end face of the first section as will be described hereinafter in detail. An external annular lock ring groove 34 is provided and is spaced axially inwardly a short distance from the stop shoulder 32.

Figure 11:
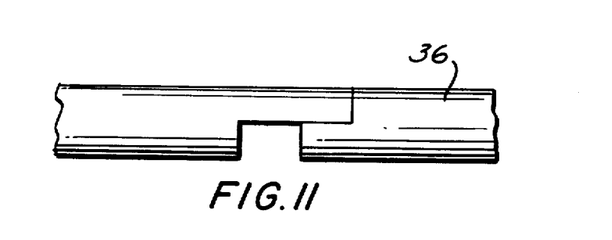
FIG. 11 is a fragmentary view of the lock ring at overlapping ends thereof.

With continued reference to FIGS. 1 and 2 one type of lock ring means is illustrated as a resilient constrictable metal lock ring 36. The lock ring 36 is contained within the annular lock ring groove 34, and in its normal (unstressed) position extends above the outer wall surface 18 (at least one-half of its height if of circular cross-section) for reasons which will become apparent as the description proceeds. The lock ring 36 is a split ring (as shown in FIG. 11) formed from spring steel or other suitable resilient alloy which can be expanded to slide over the conduit section and will snap into the groove 34. Thereupon as the expanding force is removed, the ring will return to its normal configuration in which its inner diameter is less than the outer diameter of the conduit section and exceeds the diameter of the bottom of the annular groove by an amount sufficient to allow the ring to be fully received in the groove when the ring is constricted. While the lock ring is illustrated as being a ring with a circular cross-section, a ring of oblong or square section also may be employed (see FIG. 12). Other types of lock rings are illustrated in FIGS. 13-30 and will be described hereinafter in detail.

Generally, in the preferred forms of the invention, the configurations of the lock ring means and the annular groove are such as to inhibit camming of the means radially inwardly when an axially outwardly directed force is applied thereto. To this end, the axially inward surface of the lock ring means may be flat and perpendicular to the longitudinal axis of the conduit section, as it will be if the ring is of rectangular cross-section, or said surface, if curved, will have the crest of the curve above the outer wall surface of the conduit section, as it will be if the ring is of round cross-section and projects beyond the groove 34 by more than one-half of the diameter of the cross-section. (See FIGS. 13-30 for alternative constructions).

Figure 7:
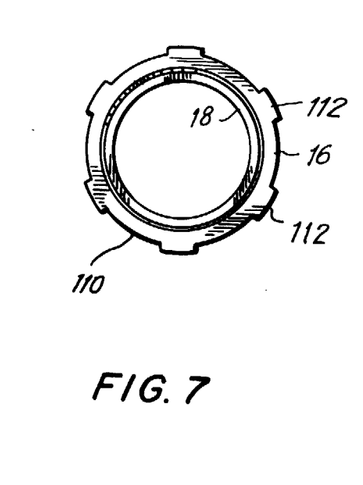
FIG. 7 is an end view of the metal conduit section at the end with the coupling sleeve mounted thereon.

The coupling sleeve in accordance with the present invention can be made of any suitable material such as steel, malleable iron, bronze, an aluminum alloy or a zinc die cast alloy. As shown in FIG. 7 the coupling sleeve 16 has an external circumference 110 (see FIG. 10) which is formed into a shape that enables it to be gripped by a torquing tool (not shown) such as a pipe wrench. The coupling sleeve may have radially outwardly extending projections 112 which provide bearing surfaces for torquing tools. It is to be understood that the particular configuration of the external circumference which enables the coupling sleeve to be gripped by torquing tools is well known in the art and does not form a part of this invention.

The coupling sleeve 16 has a first radially inwardly extending flange 40 at one end thereof and a second radially inwardly extending flange 42 at the other end thereof which define central openings of different diameters that are in axial alignment. The first flange 40 defines an opening slightly greater in diameter than that of the outer wall surface 18. The second flange 42 defines a central opening which is less in diameter than the diameter of the outer wall surface 18 but which is slightly greater than the diameter of the reduced diameter length 30. Between the flanges 40 and 42 there is an axial annular central groove 43 having a greater diameter than that of the first flange 40 thereby to create an annular clearance. A female machine thread is formed in the second flange 42. The female machine thread is dimensioned to mesh initially with the male pipe thread 24; however, since the male thread is tapered and the female thread is not, when said threads are mated and tightened, they eventually will jam. The coupling ring 16 can be slipped on to the end 26 of the conduit section 12. It is the interaction of the first and second flanges 40 and 42 with the lock ring 36 and the stop shoulder 32, respectively, which captively retains the coupling ring 16 on the unthreaded end 26 of the conduit section.

The axially outward surface of the first flange is so configured as to inhibit camming of the lock ring radially inwardly when said surface is disposed axially inwardly of the lock ring and is being pulled axially outwardly. For this purpose, said surface may be flat and perpendicular to the longitudinal axis of the conduit section or slope radially outwardly in a direction away from the second flange as will hereinafter be described.

Figure 4:
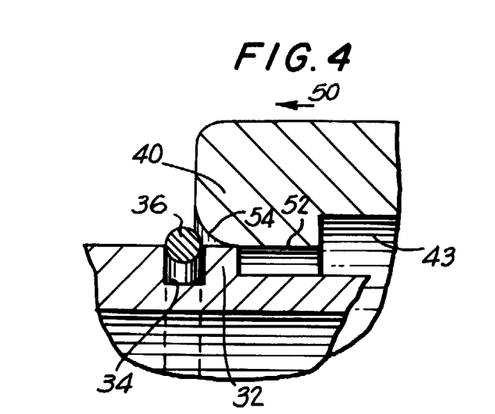
FIG. 4 is a highly enlarged fragmentary longitudinal sectional view showing the position of the coupling sleeve and one type of lock ring means when the coupling sleeve first is placed on the conduit section and slid along the section up to the lock ring.
Figure 5:
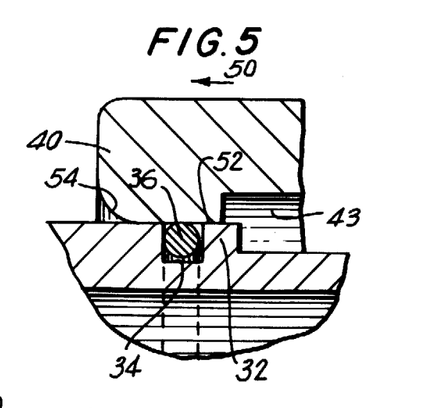
FIGS. 5 and 6 are fragmentary sectional longitudinal views similar to FIG. 4, but showing the sequential positions of the coupling sleeve and a lock ring means as the coupling ring is moved axially inwardly on the conduit section.
Figure 6:
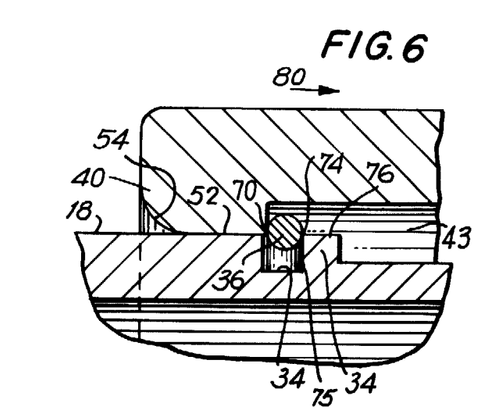

With reference to FIGS. 4, 5, 6, there is shown in sequential steps the cooperation of the first flange 40 with the lock ring 36 as the coupling sleeve is mounted on the conduit section. When the coupling sleeve 16 is first slipped onto the conduit section 12 in the direction of arrow 50 the radially inward face 52 of the first flange 40 clears the stop shoulder 32. The first flange 40 has a camming surface 54 which engages the lock ring 36. As mentioned hereinabove, the lock ring 36 can be forced inwardly or constricted into the annular lock ring groove 34. As the coupling sleeve 16 is moved further inwardly the camming surface 54 drives the lock ring 36 into the annular lock ring groove 34. The lock ring 36 is held in the groove by the face 52 as said face passes over the lock ring. Once the first flange 40 clears the lock ring, the lock ring expands into the annular clearance 43 and returns to its normal position as shown in FIG. 6. The coupling sleeve is prevented from moving axially outwardly but can still be moved axially inwardly until the inner wall 60 of the second flange 42 abuts the stop shoulder 32. The axial extent of the reduced diameter length 30 is equal to at least the width of the second flange 42 so that when the inner wall 60 abuts the stop shoulder 32 the end face 62 of the coupling sleeve 16 is at least flush with the flat end face 64 of the unthreaded conduit section 12, as shown in FIG. 2, for reasons which will hereinafter become apparent.

The aforesaid radially inward constrictive force exerted on the lock ring 36 has been described as being generated by the camming surface 54 on the axially inward face of the first flange 40. The same effect is achieved by providing, alternately, or additionally, a camming surface on the axially outward surface of the lock ring.

To assemble the first and second conduit sections, the first section 12 is brought into axial alignment with the second section 14, and its flat end face 66, which is substantially perpendicular to the longitudinal axis of the conduit section at its unthreaded end butted against the flat end face 64 at the threaded end of section 14 which is also substantially perpendicular to the longitudinal axis of the section. The inner edges of the end faces 64 and 66 preferably are slightly chamfered or beveled to remove burrs. The coupling sleeve then is threaded onto the end 22 until the corner 70 formed by the inner wall 72 and the face 52 of flange 40 engages the lock ring 36. As an effort is made to tighten the coupling sleeve 16 further along the end 22 an axially outwardly directed force 80 (shown in FIG. 6) is created. As the corner 70 is forced against the lock ring 36, the lock ring is pressed against the corner 74 formed by surface 18 and the side wall 75 of the annular lock ring groove. Since at least half of the diameter of the cross-section of the lock ring extends beyond the outer wall surface 18, or because the lock ring is of rectangular cross-section, if that be the case, the lock ring will not be cammed inwardly into the groove, but said force will be transmitted to the end face 66 of the conduit section 12, causing said face to be squeezed against the juxtaposed end face 64 of the conduit section 14. The tapered male thread 24 is so dimensioned relative to the female thread of the second flange 42 that said threads start to jam but have not fully jammed when the desired squeezing pressure has been developed at the abutment between the juxtaposed pipe ends 64, 66. With the adjoining sections thus coupled the axial passageways thereof are in axial alignment and, except for the insignificant groove formed by the end bevels, the inner surfaces of the sections present an unbroken surface to electric cable being threaded through a run of conduit so that cable can be pulled through a run without snagging at joints.

The annular lock ring groove 34 is spaced from said stop shoulder 32 a sufficient distance such that the portion 76 of the outer wall can resist shear stresses that are caused by the axially outwardly directed force 80. Testing has shown that a coupling sleeve in accordance with the present invention can withstand any axially outwardly directed force that can be developed by torquing the sleeve with conventional assembly tools.

Because a male pipe thread on the end of secton 14 is mating with a female machine thread on the coupling 16, a substantially hermetic joint is formed between the coupling sleeve 10 and the second conduit section 14.

Figure 12:
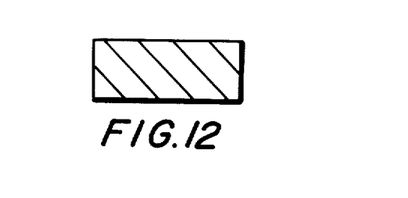
FIG. 12 is a cross-section through an alternate form of lock ring means.

In FIG. 12 there is illustrated a lock ring 36' of rectangular cross-section such as has been mentioned heretofore. This ring functions in the same manner as the lock ring 36 of circular cross-section. However, it need not, although it can, extend at least one half of the thickness of this ring above the top of the lock ring groove when unstressed.

As mentioned hereinabove, the lock ring means may be other than a ring of circular, square or rectangular cross-section. There are illustrated in FIGS. 13 through 30 various alternative constructions for the coupling sleeve, annular groove, and lock ring means which prevent the coupling sleeve, once installed, from being pulled off the conduit section by an axially outwardly directed force.

Figures 13, 15, 17:
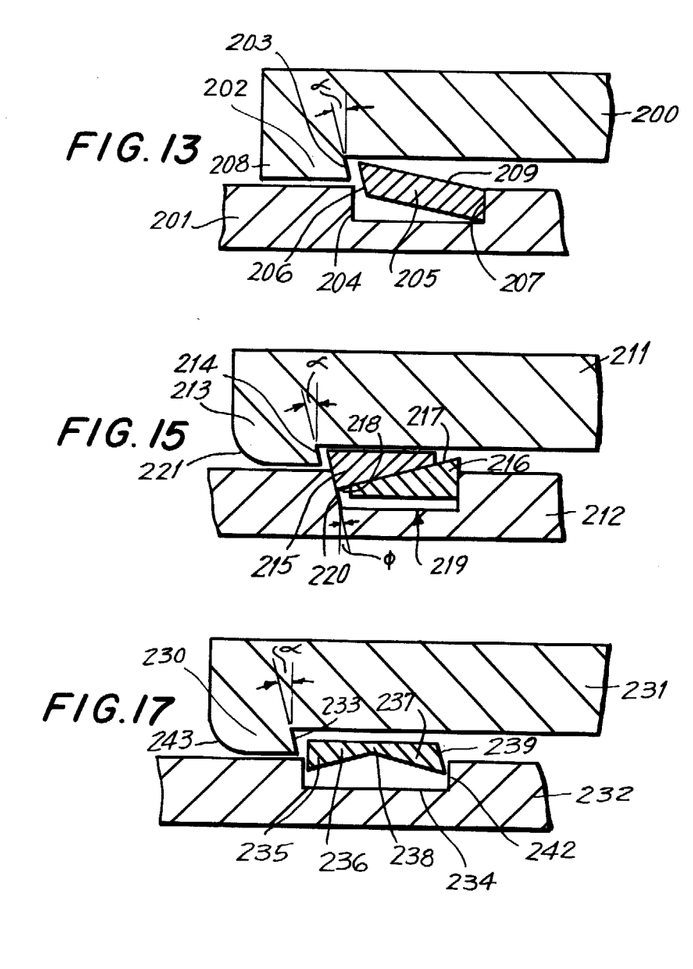
FIG. 13 is a fragmentary longitudinal sectional view showing a portion of a coupling sleeve and lock ring means of an alternative construction when the coupling sleeve is in a retracted condition.
FIG. 15 is a view similar to FIG. 13 showing a coupling sleeve and lock ring means of another alternative construction.
FIG. 17 is a view similar to FIG. 13 showing a coupling sleeve and lock ring means of a still further alternative construction.
Figure 14:
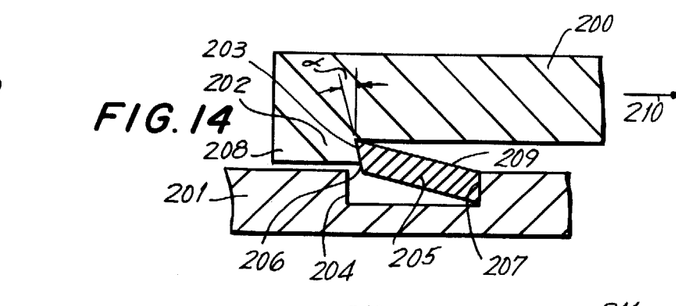
FIG. 14 is a fragmentary longitudinal sectional view of a portion of the coupling sleeve and lock ring means shown in FIG. 13, with the coupling ring urged against the lock ring means.

One alternative construction is illustrated in FIG. 13 wherein a coupling sleeve 200 is shown in retracted position on a conduit section 201. The first flange 202 of the sleeve has an axially outward surface 203 sloped radially outwardly at an angle $\alpha$ or in a direction away from the second sleeve flange (not shown). Positioned within an annular groove 204 of rectangular cross-section is a truncated conical split constrictable resilient metal lock ring 205, having axially inwardly sloped axially inward and outward ends 206 and 207. The diameter of the passageway through the ring is greater at the axially inward end of the ring than at the axially outward end. The end 207 may abut the axially outward side of the annular groove 204 in its normal condition. A portion of the truncated conical lock ring 205 extends radially outwardly of the groove 204. The axially inward face 208 of the first flange 202 need not have a camming surface thereon, since the first flange can readily pass over the upper inwardly inclined surface 209 of the ring 205 as the coupling sleeve is forced on to the conduit section. FIG. 14 illustrates the interaction of the first flange 202 with the ring 205 when the coupling sleeve, after captive implacement on the section 201, is subjected to an axially outwardly directed force 210. The sloped end surface 203 of the sleeve engages the sloped end surface 206 on the lock ring 205 extending above the outer surface of the conduit section, resulting in the lock ring 205 being forced against the axially outward side of the annular groove 204, thereby to urge the adjacent end of section 201 against the end of the next section, (not shown). It has been found, through testing, that a coupling sleeve and conical lock ring of 10-10 steel (a non-alloy steel of 0.1% carbon content), wherein the angle $\alpha$ is 18°, can withstand a linear pull of 40,000 lbs. A coupling sleeve and lock ring of 10-10 steel, without the sloped surfaces, i.e. surfaces perpendicular to the longitudinal axis of the conduit section, withstood only 16,000 lbs. linear pull. Therefore, the sloped surfaces on the flange and on the lock ring enable the ring to withstand a greater shearing force before it will fail.

Figure 16:
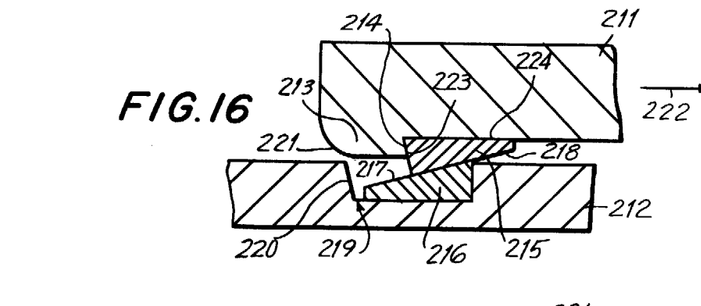
FIG. 16 is a view similar to FIG. 14 of the alternative construction illustrated in FIG. 15.

There is illustrated in FIGS. 15 and 16 another alternative construction for the coupling sleeve and lock ring. A coupling sleeve 211, captive on a conduit section 212, is provided with a first flange 213 having a sloped axially outward surface 214 extending radially outwardly at an angle $\alpha$. A lock ring means has a first and a second split constrictable resilient metal ring 215, 216, each of a truncated prismatic cross-section, which mate along their sloped longer sides 217, 218, and which are permitted limited axial movement with respect to each other within an annular groove 219 in the conduit section. The axially inward end of the first ring 215 may abut the axially outward side of the groove 219. The axially inward side 220 of the annular groove 219 may extend radially outwardly at an angle $\phi$ to encourage constriction of the ring 215 and thus permits the coupling sleeve 211 to pass over the lock rings, portions of which extend beyond the annular groove, as it is forced onto the conduit section 212. In this regard the first flange 213 is provided with a camming surface 221 to urge the rings into the annular groove at such time. When the coupling sleeve 211 is subjected to an axially outwardly directed force 222 (FIG. 16), the sloped surface 214 engages the sloped surface 223 on the ring 215. The ring 215 is forced to move in an axially outward direction, and as it does so slides along the ring 216, causing it to constrict due to the camming interaction between the sides 217 and 218. Eventually the ring 216 bottoms in the groove 219 and the ring 215 expands and wedges between the sleeve and the conduit section. The coupling sleeve is thereby locked on the conduit section 212 so that the force 222 applied to the coupling 211 urges the conduit section 212 against the conduit section on to which the coupling is being screwed.

Figure 18:
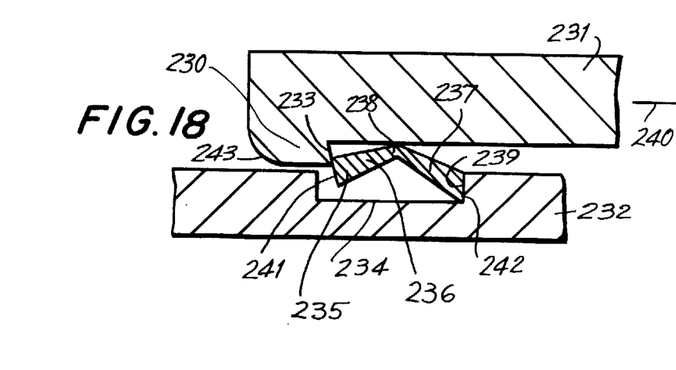
FIG. 18 is a view simlar to FIG. 14 of the alternative construction illustrated in FIG. 17.

FIGS. 17 and 18 illustrate a still further alternative construction in which a first flange 230 of a coupling sleeve 231 captive on the end of a conduit section 232, is provided with a sloped surface 233 extending radially outward at an angle $\alpha$. The lock ring means positioned partially within a rectangular cross-sectional annular groove 234 in the conduit is a split constrictable resilient metal ring 235 having a cross-sectional shape resembling two triangles 236, 237 joined at their apices to form a junction of reduced cross-section 238. For reasons which will become apparent, the ring can be flexed at the junction 238. The axially outward face 239 of triangle 237 is sloped. When an axially outwardly directed force 240 is exerted on the coupling sleeve 231 as it is screwed on to the next section, the sloped surface 233 will engage the inner face 241 on ring 235 which extends from the annular groove. The outward face 239 will abut the axially outward side 242 of the annular groove 234. The ring 235 will bow outwardly and axially shorten as shown in FIG. 18 and will prevent the coupling sleeve 231 from separating from the conduit section. It also will transmit the force 240 to urge the section 234 against the next section. Note that the axially inward face of the first flange 230 is provided with a camming surface 243 to facilitate positioning of the coupling sleeve on the end of the conduit section.

Figure 19:
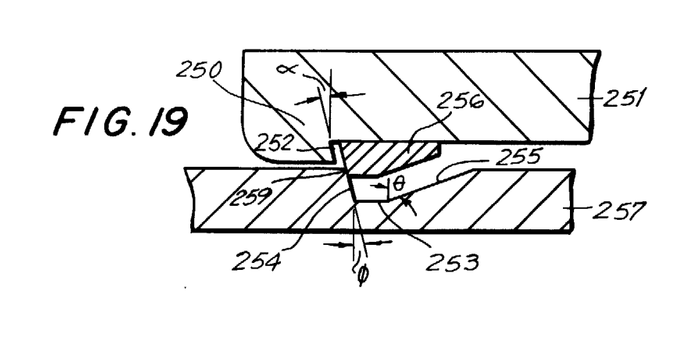
FIG. 19 is a view similar to FIG. 13 showing a coupling sleeve and lock ring means of another alternative construction.
Figure 20:
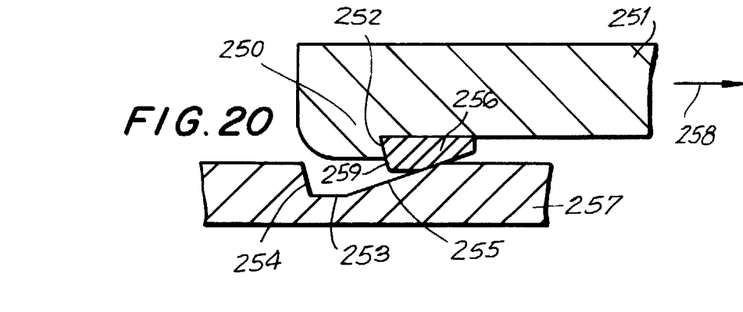
FIG. 20 is a view similar to FIG. 14 of the alternative construction illustrated in FIG. 19.

Another alternative construction is illustrated in FIGS. 19 and 20 wherein a first flange 250 of a coupling sleeve 251 is provided with a sloped inner surface 252 extending radially outwardly at an angle $\alpha$. An annular groove 253 in a conduit section 257 has its axially inward side 254 extending radially outwardly at an angle $\phi$ which may equal the angle $\alpha$. The axially outward side 255 of the groove 253 extends radially outwardly at an angle $\theta$, greater than the angle $\phi$. The lock ring means is a split resilient constrictable metal lock ring 256 having a pentagonal cross-section such that when the coupling sleeve 251 is forced on to the conduit section 257, it will be received within the annular groove 253. When an axially outwardly directed force 258 is applied to the coupling sleeve 251, the sloped surface 252 will mate with a sloped surface 259 on the ring 256 and the ring will be wedged between the coupling sleeve 251 and the side 255 of the groove 253 to retain the sleeve on the conduit section and transmit the force 258 from the sleeve 251 to the section 257 to force the latter adjacent the adjacent conduit section.

Figure 21:
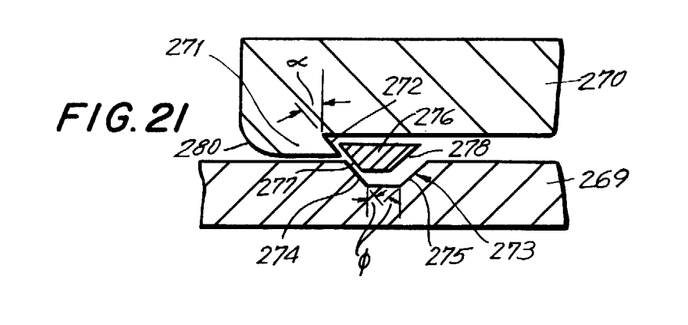
FIG. 21 is a view similar to FIG. 13 showing a coupling sleeve and lock ring means of a still further alternative construction.
Figure 22:
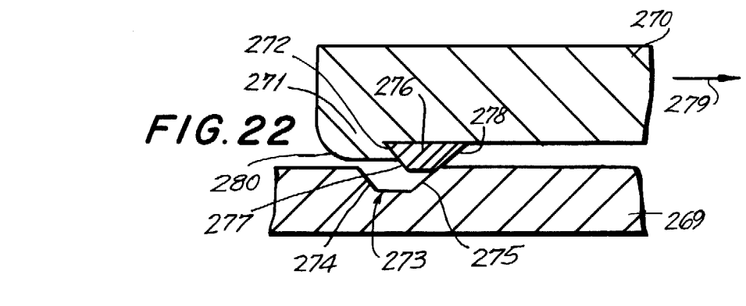
FIG. 22 is a view similar to FIG. 14 of the alternative construction illustrated in FIG. 21.

A still further alternative construction is illustrated in FIGS. 21 and 22 wherein a conduit section 269 has a coupling sleeve 270 positioned thereon which is provided with a first flange 271 having a sloped surface 272 extending at an angle α radially outwardly. An annular goove 273 in the conduit section has sloped axially inward and axially outward sides 274 and 275. Each of the sides slopes at an angle φ which preferably equals the angle α. The lock ring means is a split resilient constrictable metal lock ring 276 of trapezoidal cross-section having surfaces 277 and 278 adapted to mate with surface 272 and 275 respectively opposed axially inwardly and outwardly as shown in FIG. 22. When an axially directed force 279 is applied to the coupling ring, the surface 272 will cam against the surface 277 which will urge the surface 278 against the side 275. The ring will cam radially outwardly along the side 275 until it becomes wedged between the coupling sleeve 270 and the side 275.

To facilitate the positioning of the coupling sleeve on the conduit section, the flange is provided with a camming surface 280 adapted to urge the ring 276 into the groove to permit the flange to pass thereover.

Figure 23:
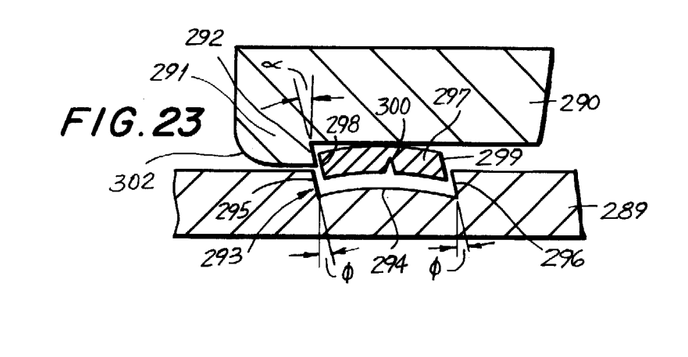
FIG. 23 is a view similar to FIG. 13 showing a coupling sleeve and lock ring means of a yet further alternative construction.
Figure 24:
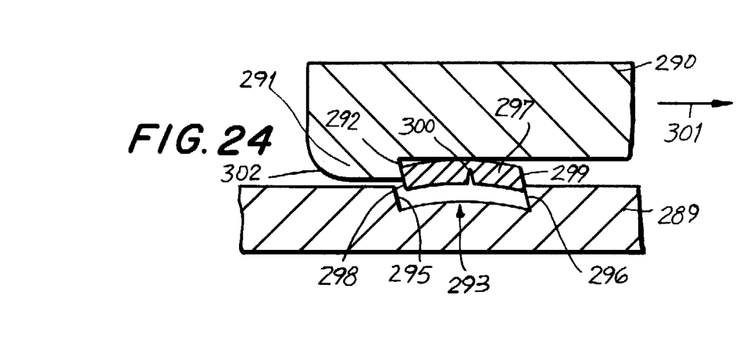
FIG. 24 is a view similar to FIG. 14 of the alternative construction illustrated in FIG. 23.

A yet further alternative construction is shown in FIGS. 23 and 24 wherein a conduit section 289 has positioned thereon a coupling sleeve 290 which is provided with a first flange 291 having a sloped surface 292 extending radially outwardly at an angle α. An annular groove 293 in the conduit section is provided with an arcuate radially outwardly convex bottom 294 and sloped sides 295 and 296, both of which slope radially outwardly from the bottom 294 at an angle 100 which preferably equals the angle α. The lock ring means is a split resilient constrictable metal lock ring 297 provided with sloped side surfaces 298 and 299. The ring has a central downwardly opening V shaped notch 300 therein which permits the ring to readily bow when under axial compressive stress for reasons which will become apparent. When an axially outwardly directed force 301 is applied to the coupling sleeve 290, the surface 292 will mate with the surface 298 on the ring which extends from the annular groove and the surface 299 will be urged against the side 296 of the annular groove. The force will cause the ring to bow and press at its center against the inside of the coupling sleeve as shown in FIG. 24, thereby locking the coupling sleeve to the conduit section. The first flange 291 may be provided with a camming surface 302 to facilitate positioning of the coupling sleeve on the conduit section during assembly.

Figures 25, 27:
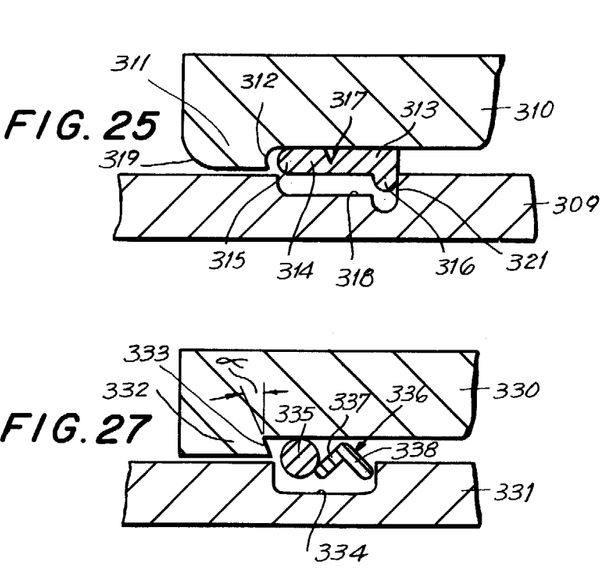
FIG. 25 is a view similar to FIG. 13 showing a coupling sleeve and lock ring means of a still further alternative construction.
FIG. 27 is a view similar to FIG. 13 showing a coupling sleeve and lock ring means of a still further alternative construction.
Figure 26:
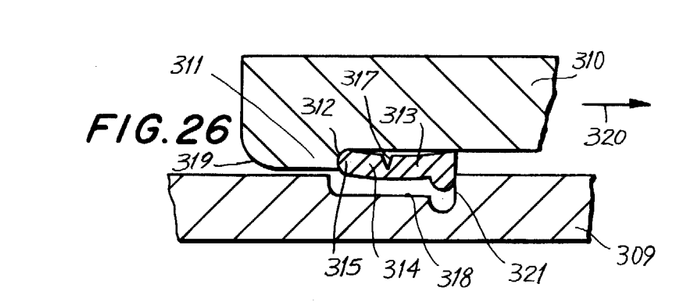
FIG. 26 is a view similar to FIG. 14 of the alternative construction illustrated in FIG. 25.

A still further alternative construction is illustrated in FIGS. 25 and 26 wherein a conduit section 309 has a coupling sleeve 310 positioned thereon provided with a first flange 311 having a concave axially outward surface 312. The lock ring means is a split resilient lock ring 313 having an elongated rectangular shank 314 with an axially inward rounded end 315 matching the surface 312. Opposite the rounded end is a radially downwardly extending projection 316 projecting from the inside of the rectangular portion 314. A v-shaped notch 317 on the outer side of the rectangular portion enables the ring to bow under axial stress. An annular groove 318 within conduit section 309 is shaped to permit the ring to be forced downwardly by the first flange 311 as the coupling sleeve 310 is positioned on conduit section. The flange may be provided with a camming surface 319 to urge the ring into the groove during assembly. Note that in the normal position, the projection 316 extends into the annular groove so that, when an axially outwardly directed force 320 is applied to the coupling sleeve, the rounded end 315 is received in the surface 312 and the projection 316 is urged against the axially outward side 321 of the annular groove 318. The ring will bow as shown in FIG. 26, to lock the coupling sleeve on the conduit section.

Figure 28:
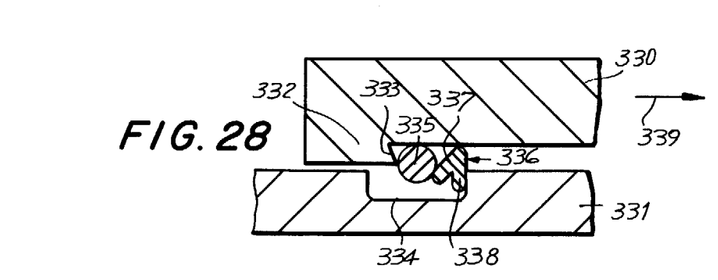
FIG. 28 is a view similar to FIG. 14 of the alternative construction illustrated in FIG. 27.

Yet a further alternative construction is illustrated in FIGS. 27 and 28 wherein a coupling sleeve 330 positioned on a conduit section 331 has a first flange 332 with a radially outwardly sloped surface 333. The surface slopes outwardly at an angle α. The surface 333 may be, instead of sloped, perpendicular to the longitudinal axis of the conduit section. Positioned within an annular groove 334 in the conduit section 331 is the lock ring means which comprises a resilient constrictable split metal ring 335 and a resilient constrictable and deformable split angle ring 336. The angle ring has two legs 337 and 338, one of which leg 337 extends into the annular groove at least as far as the bottom of the ring 335. Leg 338 also extends into the annular groove. When an axially outwardly directed force 339 is applied to the coupling sleeve, the surface 333 will press agnast ring 335 and urge it against the leg 337 of the angle ring. The other leg 338 will engage the axially outward side of the annular groove. The angle ring will deform as shown in FIG. 28 to prevent the coupling sleeve from separating from the conduit section and to lock the coupling sleeve to the conduit section.

Figure 29:
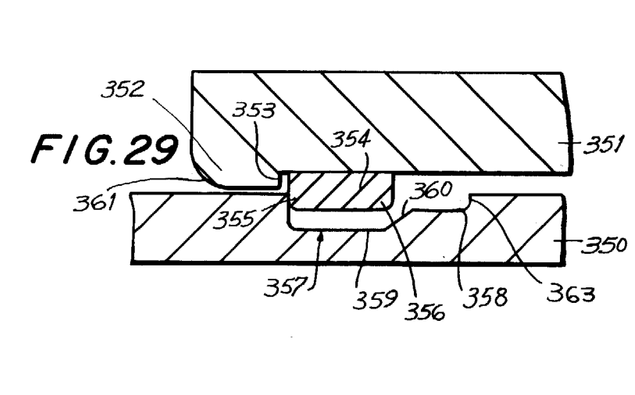
FIG. 29 is a view similar to FIG. 13 showing a coupling sleeve and lock ring means of one more alternative construction.
Figure 30:
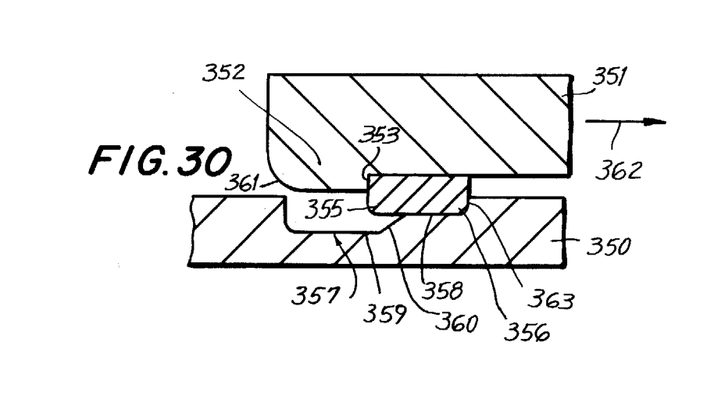
FIG. 30 is a view similar to FIG. 14 of the alternative construction illustrated in FIG. 29.

One more alternative construction is illustrated in FIGS. 29 and 30. A conduit section 350 has a coupling sleeve 351 positioned thereon having a first flange 352 with an axially outward surface 353 perpendicular to the longitudinal axis of the conduit section. The lock ring means is a resilient constrictable metal split lock ring 354 having a generally rectangular cross section, with its two corners 355, 356 closest to the longitudinal axis of the conduit section being rounded. An annular groove 357 with in the conduit section 350 has a first shallow bottom surface 358 and a second deeper bottom surface 359 joined by an inclined surface 360. The space in the annular groove above the bottom 359 permits the lock ring 354 to be received in the annular groove as the coupling sleeve is positioned on the conduit section. The first flange 352 may be provided with a camming surface 361 to urge the ring into the groove. When an axially outwardly directed force 362 is applied to the coupling sleeve (FIG. 30), the surface 353 of the first flange will engage the ring 354 and urge it along the first bottom surface 358 until it reaches the axially outward side 363 of the annular groove. The corner formed between the side 363 and the bottom surface 358 may be rounded to securely receive the corner 356 on the ring. The ring wedged between the coupling sleeve and the first bottom surface 358 securely retains the coupling sleeve on the conduit section.

If, as is often the case in field installations, the sections to be joined are not in, or cannot be brought into, an axial alignment sufficiently good to join rigid pipe sections with a threaded coupling, the sections still may be joined with ease. The central opening formed by flanges 40 and 42 are slightly greater than the outer wall surface 18 and the reduced diameter area 30, respectively, so that there are slight clearances of about 0.020" to 0.040", on the diameter, between the flanges and the corresponding outer wall portions of the conduit. These clearances permit a slight swivelling of the coupling sleeve 16 on the end of section 12 up to about ½° away from the longitudinal axis of said section. Therefore, the female thread on the coupling sleeve can mate readily with the male thread on the end of an adjoining conduit section even if the sections are not in exact axial alignment. The end faces of the sections will not abut each other initially in this situation, but they will abut after the coupling sleeve is tightened and the sections flex slightly to accommodate the abutment.

When assembled sections of conduit are to be disassembled the coupling sleeve 16 is unthreaded from the end 22 and backed off until the inner wall 60 abuts the stop shoulder 32. As mentioned hereinabove, the end face 62 of the coupling sleeve 16 at this time will be at least flush with the end face 64 of the conduit section 12 (FIG. 2) so that either conduit section 12 or 14 can be displaced laterally without longitudinal movement relative to the other conduit section. Naturally the joint at both ends of given conduit section will have to be opened (disassembled) in order to remove that section.

If this latter feature of lateral displacement without longitudinal movement relative to an adjacent section is not desired, the length 26 of reduced outer diameter is eliminated as is the extra axial length of the annular clearance 43 until the annular clearance is just along enough to receive the split metal resilient locking ring whereupon all features of the joint are retained except the one just mentioned.

Figure 8:
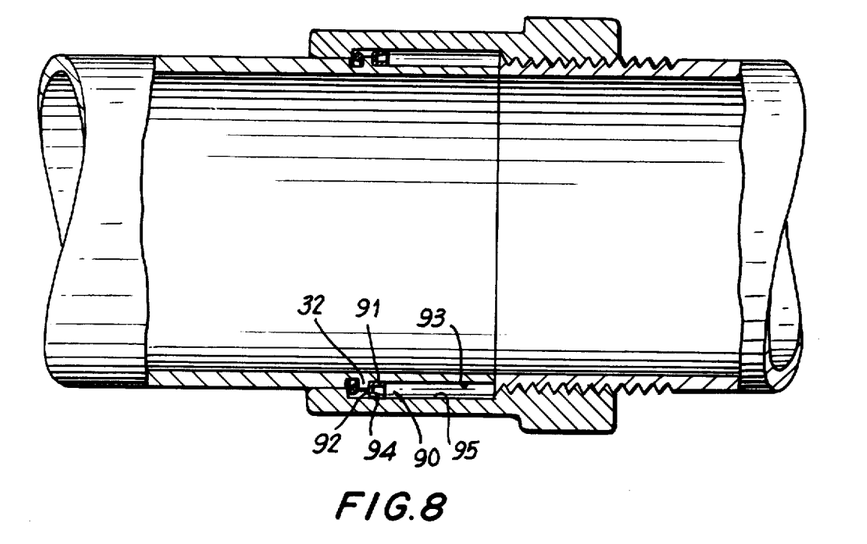
FIG. 8 is a view similar to FIG. 1, but showing the coupling sleeve provided with a seal.

While the joint in accordance with the present invention is essentially hermetic due to the appreciable force which squeezes the juxtaposed flat ends 64, 66 together and to the squareness of said ends to the longitudinal axis of the conduit sections, sealing means may be provided to further ensure that the joint will be leak-proof. As shown in FIG. 8 an annular elastomeric seal ring 90 may be situated adjacent the stop shoulder 32 in the clearance between the length of reduced diameter 30 and the base of the groove 43. The seal ring 90 is U-shaped and includes perpendicular legs 91 and 92 which abut the outer surface 93 of length 30 and the stop shoulder 32 respectively. An outwardly extended leg 94 contacts the inner surface 95 of the groove 43 to provide a barrier which prevents water leakage between the first flange 40 and the outer wall surface 18.

Figure 10:
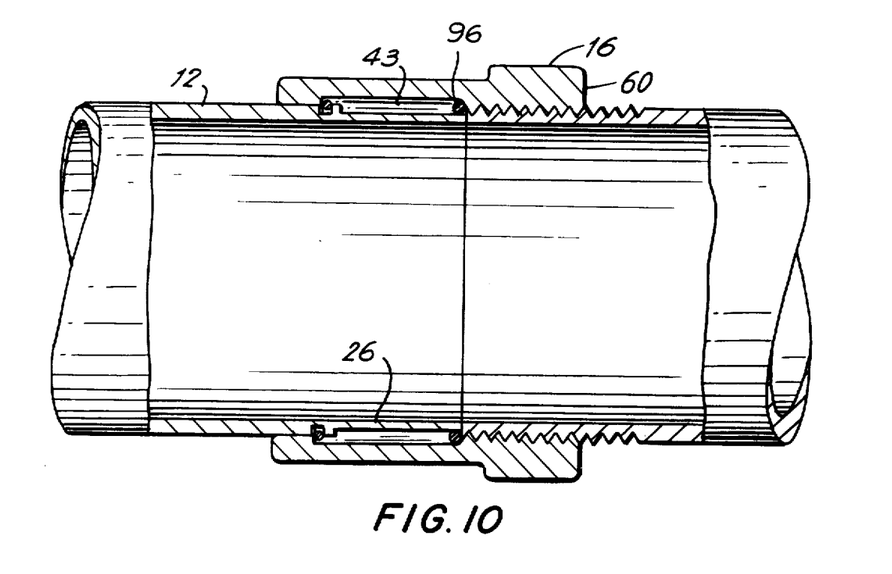
FIG. 10 is another view similar to FIG. 1, but showing another sealing arrangement.

An alternative seal construction is shown in FIG. 10 wherein a sealing elastomeric O-ring 96 is tight on the length 30 and bears against the base of groove 43.

If either of the sealing means just described is used, the axial length of the reduced diameter portion is equal to the combined width of the second flange 42 and the sealing ring so that the end face 62 of the coupling sleeve 16 will be flush with the flat face 64 of the conduit section 12 as herein above described.

Figure 9:
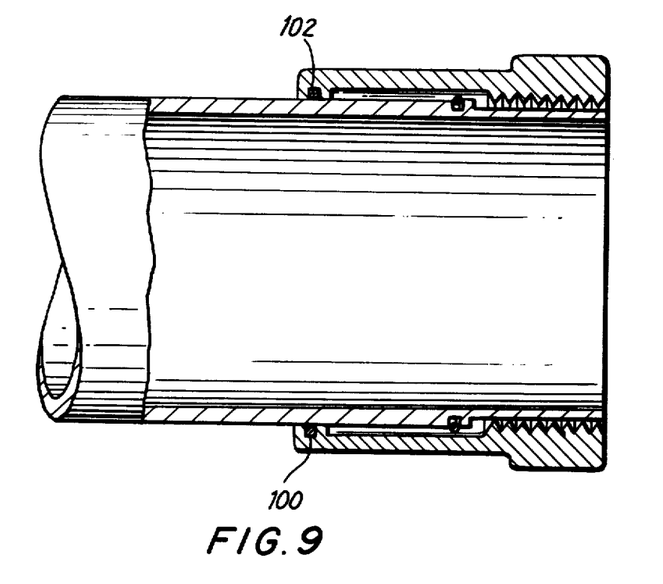
FIG. 9 is a view similar to FIG. 8, but showing an alternative seal.

Another form of sealing means is shown in FIG. 9 wherein an annular groove 100 is formed on the inner surface of the first flange 40. An elastomeric sealing O-ring 102 is positioned therein, tight on the conduit section. This will prevent water from passing between the face 52 of flange 40 and the outer wall surface 18.

It will be appreciated from the foregoing that the lock ring means hereinabove described must be capable of withstanding very high shearing stresses.

It can be seen from the foregoing detailed description that the object of the present invention, namely to create an improved joint for conduit which can be threaded, has been achieved by providing a coupling sleeve captively retained on one end of a first conduit section. The coupling sleeve is captively retained by the interaction of a pair of flanges on the coupling sleeve and a lock ring means and stop shoulder on the outer wall surface of the conduit section. A first flange defines a central opening slightly greater than the diameter of the outer wall surface of the conduit section. A second flange at the other end of the coupling sleeve defines a central opening in axial alignment with the central opening formed by the first flange, being, however, smaller in diameter than the central opening of the first flange and cooperating with a length of reduced outer diameter of the conduit section extending axially inwardly from the end face of said section to the stop shoulder.

If no axial sliding of the sleeve on its associated conduit section is desired, the length of reduced outer diameter is eliminated, the annular clearance in the coupling sleeve is shortened and the opening in the second flange is smaller than that in the first only by an amount sufficient to enable it to have female pipe threads therein which will mesh with the male pipe threads on the adjacent section.

To assemble two sections of conduit, the end of a second conduit section having external threads formed therein is abutted against the end of the first conduit section having a coupling sleeve thereon. The coupling sleeve is then screwed on to the threaded end portion until the first flange presses against the lock ring means in order to force the ends of the two sections against one another. The axially inward face of the first flange and the cooperating face of the lock ring means have cooperating camming surfaces. The axially outward face of the first flange and cooperating face of the lock ring means have cooperating non-camming surfaces.

To disassemble the conduit sections the coupling sleeve is backed off the end of the adjacent conduit section until the second flange abuts the stop shoulder in which position the end face of the coupling sleeve will be at least flush with the end face of the conduit section, permitting one conduit section to be moved laterally without moving either conduit section longitudinally along its axis.

While in accordance with the patent statutes, a preferred embodiment of the present invention has been illustrated, and described in detail it is to be particularly understood that the invention is not limited thereto or thereby.

Having thus described the invention, there is claimed as new and desired to be secrued by Letters Patent:

1. In combination, first and second two-ended metal conduit sections of 10 foot or 20 foot lengths and of weights and diameters ranging from 23.0 lbs. per section to 533.5 lbs. per section and from 2" to 8", and adapted to be connected end-to-end to each other in the field:
  (a) said first conduit section having a circular cylindrical outer wall surface and an axial passage of constant cross-sectional dimensions and configuration, one end of said first conduit section having external thread means thereon and a flat substantially perpendicular end face and said other end of said first conduit section being non-threaded and having a flat substantially perpendicular end face;
  (b) said second conduit section being identical to said first conduit section and having a circular cylindrical outer wall surface equal in diameter to said outer wall surface of said first conduit section and an axial passage of constant cross-sectional dimensions and configurations equal to said axial passage through said first conduit section, one end of said second conduit section having external thread means thereon with a flat substantially perpendicular end face matching and abutting said adjacent flat substantially perpendicular end face of said other non-threaded end of said first conduit section and said other end of said second conduit section being non-threaded and having a flat substantially perpendicular end face;

(c) a metal coupling sleeve having an end face, said coupling sleeve including female thread means extending from adjacent said end face and constructed and dimensioned to engage said external thread means on said one end of said conduit section;

(d) each of said conduit sections including in one piece therewith a length of reduced outside diameter extending axially inwardly from said flat substantially perpendicular end face at said other end of said conduit section to form a stop shoulder in said outer wall surface at said non-threaded end said shoulder being substantially perpendicular to the length of the conduit section;

(e) each of said conduit sections having means providing an annular lock ring groove in said outer wall surface near and spaced axially inwardly from said stop shoulder;

(f) resilient constrictable lock ring means of spring metal partly in said annular lock ring groove and projecting partially out of said groove; and (g) abutment means extending radially inwardly on said metal coupling sleeve to define a periphery spaced from the outer diameter of the associated conduit section by a slight clearance adapted to cooperate with said stop shoulder and said projecting part of said lock ring means to permit free rotation of said coupling sleeve on said first conduit section and limited axially inward and axially outward movement of said coupling sleeve along said non-threaded end of said first conduit section so that said coupling sleeve can be threaded onto said externally threaded end of said second conduit section so as to force said end faces of said first and second conduit sections together without rotation of either section and may be backed off said externally threaded end of said second conduit section after said first and second conduit sections are assembled whereby said end face of said coupling sleeve is at least flush with said flat substantially perpendicular end face of said first conduit section to permit said first conduit section to be laterally displaced from said second conduit section without longitudinal movement of either conduit section, said abutment means and said lock ring means being constructed to prevent said lock ring means from being forced inwardly entirely into said annular lock ring groove when said end faces of said first and second conduit sections are forced together;

(h) the clearance between said periphery defined by said abutment means and the outer diameter of the associated conduit section, being in the order of 0.020″ to 0.040″ on the diameter sufficient to prevent sections connected by the metal coupling sleeve to be slightly out of axial alignment up to about $\frac{1}{2}°$ without interfering with the engagement between the female thread means and the coupling sleeve of the internal thread means engageable thereby with one end of a conduit section.

2. A joint in accordance with claim 1 wherein said lock ring means in its normal unbiased condition projecting above said outer wall surface and being constrictable into said annular lock ring groove, and wherein said abutment means comprises first and second radially inwardly extending flanges on opposite ends of said coupling sleeve, said second flange having said female thread means, said first flange defining a central opening of a diameter slightly greater than the diameter of said outer wall surface, said second flange defining a central opening smaller than the diameter of said outer wall surface but slightly greater than the diameter of said area of reduced outside diameter, said central openings being in axial alignment so that said coupling sleeve may be slipped onto said first conduit section, an axially extending annular clearance formed between said first and second flanges, at least one of said lock ring and a cooperating surface of said first flange having camming means to constrict said lock ring into said annular lock ring groove when said coupling sleeve is moved axially inwardly on said first conduit section, said lock ring returning to its normal unbiased condition in said annular clearance when said first flange clears said ring, a surface of said first flange and said lock ring having cooperating abutment means to prevent said coupling sleeve from being pulled axially outwardly from said conduit section and over said lock ring, said area of reduced outside diameter extending axially inwardly the width of said second flange so that when said coupling sleeve is in its retracted position said second flange will abut said stop shoulder and said end of said coupling ring will be flush with said end face of said first section.

3. A joint in accordance with claim 2 wherein one of said thread means is a pipe thread and the other of said thread means is a machine thread, said thread means meshing to form an hermetic seal when said coupling sleeve is threaded on said end of said second conduit section.

4. A joint in accordance with claim 2 wherein the camming means is on the first flange.

5. A joint in accordance with claim 2 further including sealing means to prevent leakage of water between said coupling sleeve and said first conduit section.

6. A joint in accordance with claim 5 wherein said sealing means comprises:

(a) means providing an annular groove in said first flange; and (b) a sealing elastomeric O-ring in said annular groove and tight on said first conduit section.

7. A joint in accordance with claim 5 wherein said sealing means comprises an elastomeric annular member including:

(a) a pair of perpendicular sides, one of said sides engaging said stop shoulder and the other engaging said length of reduced outside diameter; and (b) an outwardly extending leg extending from one of said sides and engaging said coupling sleeve.

8. A joint in accordance with claim 5 wherein said sealing means comprises a sealing ring mounted to said coupling sleeve within said annular clearance abutting said second flange.

9. A joint in accordance with claim 2 wherein said at least one resilient constrictable metal split lock ring has a rectangular cross-section and the axially outward surface of said first flange is perpendicular to the longitudinal central axis of said conduit section so that said axially outward surface will abut said portion of said rectangular cross-sectioned lock ring to prevent said coupling sleeve from being pulled axially outward from said conduit section.

10. A joint in accordance with claim 2 wherein said at least one resilient constrictable split lock ring is of a truncated conical shape having axially inwardly sloped axially inward and outward ends and an upper inwardly inclined surface therethrough with a diameter greater at said axially inward end than at said axially outward end, at least a portion of said sloped axially inward end extending from said annular groove above said outer surface of said first conduit section, and the axially outward surface of said first flange is sloped radially outwardly at an angle away from said second flange so that when said coupling sleeve is subject to an axially outwardly directed force, said sloped axially outward surface of said first flange engages said sloped axially inward end of said ring extending above said surface of said first conduit section resulting in said ring being forced against said axially outward side of said annular groove to prevent said coupling sleeve from being pulled axially outwardly from said first conduit section.

11. A joint in accordance with claim 10 wherein said axially outward surface of said first flange is sloped radially outwardly at an angle of 18°.

12. A joint in accordance with claim 10 wherein said axially inwardly sloped axially inward end of said ring and said axially outward surface of said first flange have an identical slope.

13. A joint in accordance with claim 2 wherein said at least one split lock ring comprises a first resilient constrictable split metal ring having a truncated prismatic cross-section with a sloped longer side and a second resilient constrictable split metal lock ring having a truncated prismatic cross-section with a sloped longer side, said first and second split constrictable resilient metal rings mating along said sloped longer sides and permitted limited axial movement with respect to each other within said annular groove, said first and second resilient constrictable split metal lock rings having portions extending above the outer surface of said first conduit section when said lock rings are in the normal condition, and the axially outward surface of said first flange is sloped radially outwardly so that when said coupling is subjected to an axially outwardly directed force said sloped axially outward surface of said first flange engages said sloped axially inward surface on said first resilient constrictable split metal lock ring thereby forcing said ring to move in an axially outward direction along said second resilient constrictable split metal lock ring constricting said second resilient constrictable split metal lock ring due to the camming interaction of said sloped longer sides, whereby said first resilient constrictable split metal lock ring will expand and wedge between said coupling sleeve and said first conduit section to prevent said coupling sleeve from being pulled axially outwardly from said first conduit section.

14. A joint in accordance with claim 13 wherein said axially inward side of said annular groove may extend radially outwardly to encourage constriction of said first resilient constrictable split metal lock ring as said coupling sleeve is passed axially inwardly over said first and second resilient constrictable split metal lock rings when forced onto said first conduit section.

15. A joint in accordance with claim 2 wherein said at least one split lock ring, a portion of which extends above said outer surface of said first conduit section, has a trapezoidal cross-section having opposed axially inwardly and outwardly sloped surfaces wherein said annular groove has sloped axially inward and outward sides, and wherein the axially outward surface of said first flange slopes radially outwardly so that when said coupling sleeve is subjected to an axially outwardly directed force, said sloped outward surface of said first flange will engage said sloped axially inward surface of said resilient constrictable split lock ring above said outer surface of said first conduit section, resulting in said ring being forced against said sloped axially outward side of said annular groove thereby camming said ring radially outwardly along said sloped axially outward side until it is wedged between said side and said coupling sleeve to prevent said coupling sleeve from being pulled axially outwardly from said first conduit section.

16. A joint in accordance with claim 2 wherein said at least one split lock ring has a cross-sectional shape resembling two triangles joined at their apices forming a junction of a reduced cross-section and has a sloped axially inward face, a portion of said ring extending above said outer surface of said first conduit section having its axially outward side sloped axially outwardly and the axially outward surface of said first flange is sloped radially outwardly so that when said coupling sleeve is subjected to an axially outwardly directed force, said sloped axially outward surface of said first flange engages said sloped axially inward face of said ring extending above said outer surface of said first conduit section resulting in said sloped axially outward face abutting said axially outward side of said annular groove causing said ring to bow and axially shorten thereby wedging itself between said first conduit section and said coupling sleeve to prevent said coupling sleeve from being pulled axially outwardly from said first conduit section.

* * * * *